United States Patent
Yang et al.

(10) Patent No.: US 12,039,121 B2
(45) Date of Patent: Jul. 16, 2024

(54) TOUCH DISPLAY DRIVING MODULE, TOUCH DISPLAY DRIVING METHOD, AND DISPLAY DEVICE

(71) Applicants: Beijing BOE Optoelectronics Technology Co., Ltd., Beijing (CN); BOE Technology Group Co., Ltd., Beijing (CN)

(72) Inventors: Hong Yang, Beijing (CN); Zhaohui Meng, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/642,813

(22) PCT Filed: May 18, 2021

(86) PCT No.: PCT/CN2021/094235
§ 371 (c)(1),
(2) Date: Mar. 14, 2022

(87) PCT Pub. No.: WO2021/249131
PCT Pub. Date: Dec. 16, 2021

(65) Prior Publication Data
US 2022/0413649 A1 Dec. 29, 2022

(30) Foreign Application Priority Data
Jun. 9, 2020 (CN) .......................... 202010517652.8

(51) Int. Cl.
*G06F 3/041* (2006.01)
*G06F 3/147* (2006.01)
(Continued)

(52) U.S. Cl.
CPC .......... *G06F 3/0416* (2013.01); *G06F 3/0412* (2013.01); *G06F 3/147* (2013.01);
(Continued)

(58) Field of Classification Search
CPC .. G06F 3/0412; G06F 3/0416; G06F 3/04166; G06F 3/147; G09G 3/2044;
(Continued)

(56) References Cited

U.S. PATENT DOCUMENTS 6,801,211 B2   10/2004   Forsline et al.

FOREIGN PATENT DOCUMENTS

CN   102156586 A   8/2011
CN   103294316 A   9/2013
(Continued)

OTHER PUBLICATIONS

Applied Sciences Group, "Virtual Transparency Aided Back Touch", https://www.youtube.com/watch?v=icoLom4CMws (Year: 2014).*
(Continued)

*Primary Examiner* — Julie Anne Watko
(74) *Attorney, Agent, or Firm* — IPro, PLLC (57) ABSTRACT

A touch display driving module for performing a touch display driving operation on a display screen, a touch display driving method for the touch display driving module, and a display device are provided. The touch display driving module includes a touch detection chip, a time sequence touch control chip and a host. The time sequence touch control chip performs data calculation in accordance with a touch data signal to generate touch point coordinate information, generate touch point image information in accordance with the touch point coordinate information, and display the touch point image on a display screen in accordance with the touch point image information, the host performs control response in accordance with the touch
(Continued)

point coordinate information to generate control response image information, and returns the control response image information, the time sequence touch control chip displays the control response image on the display screen.

16 Claims, 6 Drawing Sheets

(51) Int. Cl.
  *G09G 5/02* (2006.01)
  *G09G 5/20* (2006.01)
  *G09G 5/377* (2006.01)
(52) U.S. Cl.
  CPC ............... *G09G 5/026* (2013.01); *G09G 5/20* (2013.01); *G09G 5/377* (2013.01); *G09G 2320/0252* (2013.01)
(58) Field of Classification Search
  CPC .......... G09G 5/026; G09G 5/20; G09G 5/377; G09G 2320/0252; G09G 2330/12; G09G 2354/00

See application file for complete search history.

(56) References Cited

FOREIGN PATENT DOCUMENTS

| CN | 105353918 A | * | 2/2016 |
|----|-------------|---|--------|
| CN | 105353918 A |   | 2/2016 |
| CN | 105353928 A |   | 2/2016 |

OTHER PUBLICATIONS

PCT/CN2021/094235 International search report and written opinion.

* cited by examiner

TOUCH DISPLAY DRIVING MODULE, TOUCH DISPLAY DRIVING METHOD, AND DISPLAY DEVICE

CROSS-REFERENCE TO RELATED APPLICATIONS

This application is the U.S. national phase of PCT Application No. PCT/CN2021/094235 filed on May 18, 2021, which claims a priority of the Chinese Patent Application No. 202010517652.8 filed on Jun. 9, 2020, the entire contents of which are hereby incorporated by reference.

TECHNICAL FIELD

The present disclosure relates to the field of touch display technology, and particularly to a touch display driving module, a touch display driving method, and a display device.

BACKGROUND

As a new input method in the field of display technology, a touch technology has become a simplest, natural, and fast human-computer interaction mode. In recent years, in order to meet the requirements on low cost as well as a light and thin terminal, an incell touch technology has attracted more and more attention. However, for the incell touch technology, a touch operation needs to be completed within a same frame as a display operation, so the touch operation has a same timeline as the display operation. In this mode, the touch operation is accomplished through the following devices and steps.

Usually, a touch system includes a touch screen controller and a touch detection system. The touch detection system is generally installed at a front end of a display, and it mainly functions as to detect touch position data about a user and transmit information to the touch screen controller. The touch screen controller mainly functions as to receive touch data from a touch detection device, process on the touch data, convert it into coordinates of a touch point, and transmit the coordinates to a host. Meanwhile, the host obtains a touch icon and a touch command feedback through picture rendering, generates a composite image, and then controls the display. Due to the timeline and the limitation of data processing and transmission, a touch response time is excessively long, e.g., greater than 30 ms. In the case of such operations as rapidly drawing a line, writing or drawing a circle, the user experience is inferior to the conventional writing and display control.

SUMMARY

In one aspect, the present disclosure provides in some embodiments a touch display driving module for performing a touch display driving operation on a display screen. The touch display driving module includes a touch detection chip and a time sequence touch control chip. The touch detection chip is configured to generate a touch data signal in accordance with a touch event. The time sequence touch control chip is configured to perform data calculation in accordance with the touch data signal to generate touch point coordinate information, generate touch point image information in accordance with the touch point coordinate information, and display a touch point image on the display screen in accordance with the touch point image information. The touch point coordinate information is information carrying coordinates of a touch point, the touch point image is an image showing that the touch point is touched, and the touch point image information is display information corresponding to the touch point image.

In a possible embodiment of the present disclosure, the touch display driving module further includes a host, and the time sequence touch control chip is further configured to transmit the touch point coordinate information to the host. The host is configured to perform control response in accordance with the touch point coordinate information to generate control response image information, and return the control response image information to the time sequence touch control chip, and the control response image information is display information corresponding to the control response image. The time sequence touch control chip is further configured to display the control response image on the display screen in accordance with the control response image information, and the control response image is an image showing a response action after the display screen has been touched.

In a possible embodiment of the present disclosure, the time sequence touch control chip is specifically configured to display and render a pre-stored background image in accordance with the touch point coordinate information and preset coordinate pattern display information so as to generate the touch point image information, and the coordinate pattern display information carries a correspondence between the touch point coordinate information and the touch point pattern information.

In a possible embodiment of the present disclosure, the time sequence touch control chip includes a touch control circuitry, a display control circuitry and a storage array. The touch detection chip is further configured to perform gain filtration on the touch data signal to generate a gain-filtered touch data signal, the touch control circuitry is configured to sample the gain-filtered touch data signal and calculate the gain-filtered touch data signal to obtain the touch point coordinate information, the background image is pre-stored in the storage array, and the display control circuitry is configured to display and render the background image in accordance with the touch point coordinate information and preset coordinate pattern display information to generate the touch point image information.

In a possible embodiment of the present disclosure, the display control circuitry includes a time sequence control unit circuitry, the coordinate pattern display information is provided in the time sequence control unit circuitry, the touch control circuitry is electrically coupled to the storage array and configured to obtain the background image and transmit the touch point coordinate information and the background image to the time sequence control unit circuitry, and the time sequence control unit circuitry is configured to display and render the background image in accordance with the touch point coordinate information and the coordinate pattern display information to generate the touch point image information.

In a possible embodiment of the present disclosure, the touch display driving module further includes a host, and the touch control circuitry is further configured to transmit the touch point coordinate information to the host. The host is configured to perform control response in accordance with the touch point coordinate information to generate control response image information, and return the control response image information to the time sequence control unit circuitry, and the control response image information is display information corresponding to the control response image. The time sequence control unit circuitry is further configured to display the control response image on the display screen in accordance with the control response image information, and the control response image is an image showing a response action after the display screen has been touched.

In another aspect, the present disclosure provides in some embodiments a touch display driving method for the above-mentioned touch display driving module, including: generating, by the touch detection chip, a touch data signal in accordance with a touch event; and performing, by the time sequence touch control chip, data calculation in accordance with the touch data signal to generate touch point coordinate information, generating, by the time sequence touch control chip, touch point image information in accordance with the touch point coordinate information, and displaying the touch point image on the display screen in accordance with the touch point image information. The touch point image information is display information corresponding to the touch point image, the touch point coordinate information is information carrying coordinates of a touch point, and the touch point image is an image showing that the touch point is touched.

In a possible embodiment of the present disclosure, the touch display driving module further includes a host. The touch display driving method further includes: transmitting, by the time sequence touch control chip, the touch point coordinate information to the host; performing, by the host, control response in accordance with the touch point coordinate information to generate control response image information, and returning the control response image information to the time sequence touch control chip, the control response image information being display information corresponding to the control response image; and displaying, by the time sequence touch control chip, the control response image on the display screen in accordance with the control response image information, the control response image being an image showing a response action after the display screen has been touched.

In a possible embodiment of the present disclosure, the generating, by the time sequence touch control chip, the touch point image in accordance with the touch point coordinate information includes displaying and rendering, by the time sequence touch control chip, a pre-stored background image in accordance with the touch point coordinate information and preset coordinate pattern display information to generate the touch point image information, and the coordinate pattern display information carries a correspondence between the touch point coordinate information and the touch point pattern information.

In a possible embodiment of the present disclosure, the time sequence touch control chip includes a touch control circuitry, a display control circuitry and a storage array, and the background image is stored in the storage array. The performing, by the time sequence touch control chip, data calculation in accordance with the touch data signal to generate touch point coordinate information includes sampling, by the touch control circuitry, a touch data signal and performing gain filtration and calculation on the touch data signal to obtain the touch point coordinate information. The generating, by the time sequence touch control chip, touch point image information in accordance with the touch point coordinate information includes displaying and rendering, by the display control circuitry, the background image in accordance with the touch point coordinate information and the preset coordinate pattern display information to generate the touch point image information.

In a possible embodiment of the present disclosure, the display control circuitry includes a time sequence control unit circuitry, and the coordinate pattern display information is provided in the time sequence control unit circuitry. The generating, by the time sequence touch control chip, the touch point image information in accordance with the touch point coordinate information includes: obtaining, by the touch control circuitry, the background image from the storage array, and transmitting the touch point coordinate information and the background image to the time sequence control unit circuitry; and displaying and rendering, by the time sequence control unit circuitry, the background image in accordance with the touch point coordinate information and the coordinate pattern display information to generate the touch point image information.

In a possible embodiment of the present disclosure, the touch display driving module further includes a host. The touch display driving method further includes: transmitting, by the touch control circuitry, the touch point coordinate information to the host; performing, by the host, control response in accordance with the touch point coordinate information, generating control response image information, and returning the control response image information to the time sequence control unit circuitry, the control response image information being display information corresponding to the control response image; and displaying, by the time sequence control unit circuitry, the control response image on the display screen in accordance with the control response image information, the control response image being an image showing a response action after the display screen has been touched.

In yet another aspect, the present disclosure provides in some embodiments a display device including the above-mentioned touch display driving module.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be triodes, thin film transistors (TFT), field effect transistors (FETs) or any other elements having an identical characteristic. In order to differentiate two electrodes other than a control electrode from each other, one of the two electrodes is called as first electrode and the other is called as second electrode.

In actual use, when the transistor is a triode, the control electrode may be a base, the first electrode may be a collector and the second electrode may be an emitter, or the control electrode may be a base, the first electrode may be an emitter and the second electrode may be a collector.

In actual use, when the transistor is a TFT or FET, the control electrode may be a gate electrode, the first electrode may be a drain electrode and the second electrode may be a source electrode, or the control electrode may be a gate electrode, the first electrode may be a source electrode and the second electrode may be a drain electrode.

Figure 1:
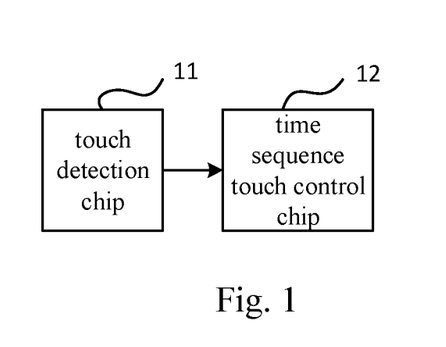
FIG. 1 is a block diagram of a touch display driving module according to one embodiment of the present disclosure.

The present disclosure provides in some embodiments a touch display driving module for performing a touch display driving operation on a display screen. As shown in FIG. 1, the touch display driving module includes a touch detection chip 11 and a time sequence touch control chip 12. The touch detection chip 11 is configured to generate a touch data signal in accordance with a touch event. The time sequence touch control chip 12 is electrically coupled to the touch detection chip 11, and configured to perform data calculation in accordance with the touch data signal to generate touch point coordinate information, generate touch point image information in accordance with the touch point coordinate information, and display a touch point image on the display screen in accordance with the touch point image information. The touch point coordinate information is information carrying coordinates of a touched point; the touch point image is an image showing that a touch point is touched, and the touch point image information is display information corresponding to the touch point image.

According to the embodiments of the present disclosure, the touch control chip and a time sequence controller (TCON) are combined into the time sequence touch control chip, and the time sequence touch control chip generates the touch point image information before displaying a control response image, so it is able to display the touch point image in advance, thereby to reduce a touch response time.

In the embodiments of the present disclosure, upon the detection of a touch operation, the time sequence touch control chip may immediately return the touch point image in accordance with a preset touch control algorithm and a display scheme in conjunction with a corresponding touch data processing process, so as to reduce the touch response time to 20 ms, i.e., to respond to touch information generated by an active stylus and a finger within 10 ms.

In the embodiments of the present disclosure, the touch point image is an image showing that the touch point is touched. For example, when the display screen is touched by the finger, the touch point image may include, but not limited to, a current background image on the display screen, and a touch point pattern of the finger or active stylus with the display screen.

In the embodiments of the present disclosure, the circuitries for collecting and displaying the touch data signal are designed and integrated to form the time sequence touch control chip, so as to miniaturize a driving chip, shorten a signal transmission path, and provide a transmission line inside, rather than outside, the chip, thereby to improve the data transmission speed and quality.

Figure 2:
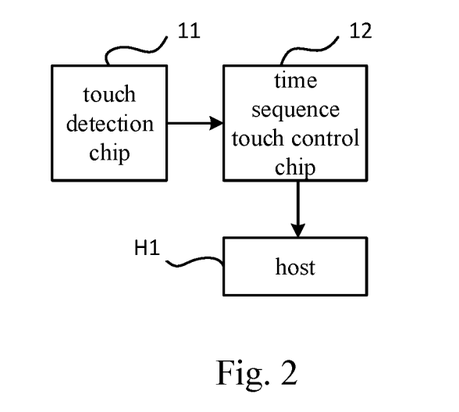
FIG. 2 is another block diagram of the touch display driving module according to one embodiment of the present disclosure.

During the implementation, as shown in FIG. 2, on the basis of the touch display driving module in FIG. 1, the touch display driving module further includes a host H1. The time sequence touch control chip 12 is further electrically coupled to the host H1, and configured to transmit the touch point coordinate information to the host. The host H1 is configured to perform control response in accordance with the touch point coordinate information, generate control response image information, and return the control response image information to the time sequence touch control chip 12. The control response image information is display information corresponding to a control response image. The time sequence touch control chip 12 is further configured to display the control response image on the display screen in accordance with the control response image information, and the control response image is an image showing a response action after the display screen has been touched.

In the embodiments of the present disclosure, the host H1 receives the touch point coordinate information from the time sequence touch control chip 12, performs the control response in accordance with the touch point coordinate information, generates the control response image information, and transmits the control response image information to the time sequence touch control chip 12. The time sequence touch control chip 12 displays the control response image.

In the embodiments of the present disclosure, the control response image is a response image generated after the display screen has been touched. For example, it includes, but not limited to, a response image when an icon is selected, or a response image when an icon is moved by a finger or an active stylus, or a response image when an icon is double-clicked and a corresponding program is started.

In the embodiments of the present disclosure, the touch display image is divided into the touch point image and the control response image, and the time sequence touch control chip displays the touch point image in advance so as to reduce the response time from 30-50 ms to less than 10 ms. In the embodiments of the present disclosure, the time sequence touch control chip is specifically configured to display and render a pre-stored background image in accordance with the touch point coordinate information and preset coordinate pattern display information so as to generate the touch point image information. The coordinate pattern display information carries a correspondence between the touch point coordinate information and the touch point pattern information.

During the implementation, the coordinate pattern display information is preset in the time sequence control touch control chip, and the coordinate pattern display information carries the correspondence between the touch point coordinate information and the touch point pattern information. The time sequence control touch control chip generates the touch point pattern information corresponding to the touch point coordinate information in accordance with the touch point coordinate information and the correspondence, and displays and renders the pre-stored background image in accordance with the touch point pattern information to generate the touch point image information.

Figure 3:
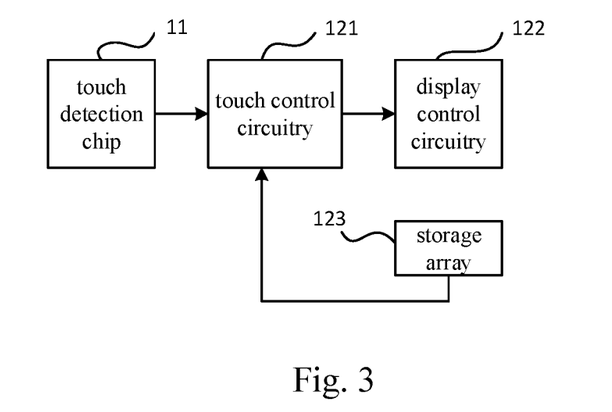
FIG. 3 is yet another block diagram of the touch display driving module according to one embodiment of the present disclosure.

During the implementation, as shown in FIG. 3, on the basis of the touch display driving module in FIG. 1, the time sequence touch control chip 12 includes a touch control circuitry 121, a display control circuitry 122 and a storage array 123. The touch detection chip 11 is further configured to perform gain filtration on the touch data signal to generate a gain-filtered touch data signal. The background image is pre-stored in the storage array 123. The touch control circuitry 121 is electrically coupled to the touch detection chip 11, and configured to sample the gain-filtered touch data signal, calculate the gain-filtered touch data signal to obtain the touch point coordinate information. The touch control circuitry 121 is further configured to obtain the background image and transmit the touch point coordinate information and the background image to the display control circuitry 122. The display control circuitry 122 is electrically coupled to the touch control circuitry 12, and configured to display and render the background image in accordance with the touch point coordinate information and the preset coordinate pattern display information, so as to generate the touch point image information.

In the embodiments of the present disclosure, the time sequence touch control chip 12 includes the touch control circuitry 121, the display control circuitry 122, and the storage array 123. The touch detection chip 11 performs the gain filtration on the touch data signal. The touch control circuitry 121 samples the gain-filtered touch data signal and obtains the touch point coordinate information in accordance with the touch data signal. The background image is pre-stored in the storage array 123. The display control circuitry 122 displays and renders the background image in accordance with the touch point coordinate information and the preset coordinate pattern display information so as to generate the touch point image information.

In the embodiments of the present disclosure, the storage array 123 may be, but not limited to, a double data rate synchronous dynamic random access memory (DDR).

Figure 4:
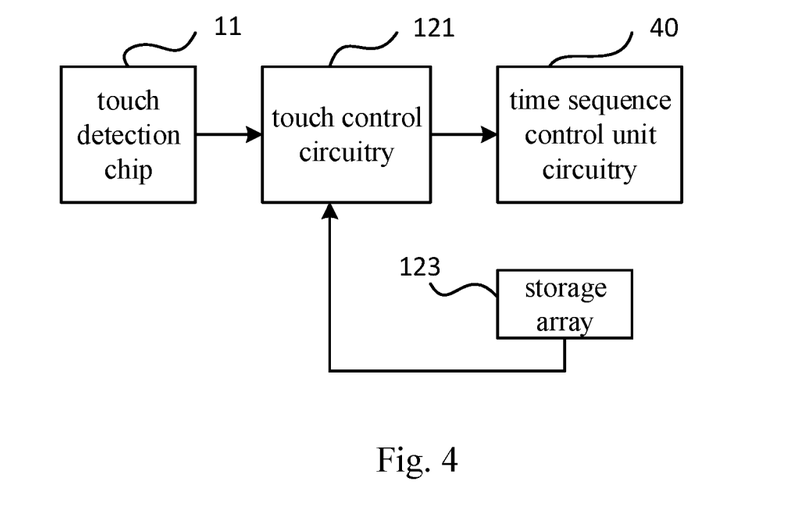
FIG. 4 is still yet another block diagram of the touch display driving module according to one embodiment of the present disclosure.

Specifically, as shown in FIG. 4, on the basis of the touch display driving module in FIG. 3, the display control circuitry includes a time sequence control unit circuitry 40, and the coordinate pattern display information is provided in the time sequence control unit circuitry 40. The touch control circuitry 121 is electrically coupled to the storage array 123 and the time sequence control unit circuitry 40, and configured to obtain the background image and transmit the touch point coordinate information and the background image to the time sequence control unit circuitry 40. The time sequence control unit circuitry 40 is configured to display and render the background image in accordance with the touch point coordinate information and the coordinate pattern display information so as to generate the touch point image information.

During the implementation, the display control circuitry 122 includes the time sequence control unit circuitry 40, and the coordinate pattern display information is provided in the time sequence control unit circuitry 40. The time sequence control unit circuitry 40 is configured to display and render the background image in accordance with the touch point coordinate information and the coordinate pattern display information so as to generate the touch point image information.

Figure 5:
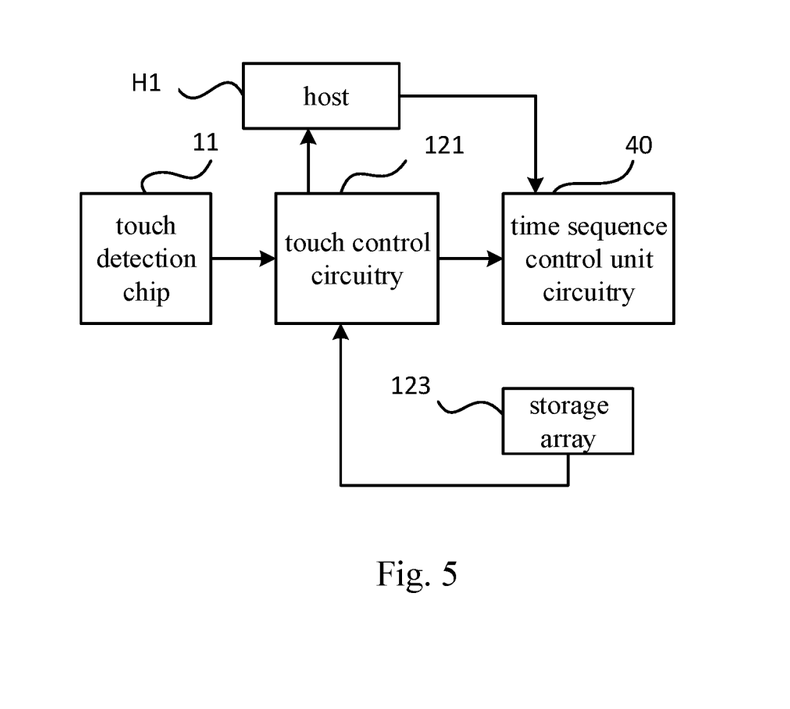
FIG. 5 is still yet another block diagram of the touch display driving module according to one embodiment of the present disclosure.

In the embodiments of the present disclosure, as shown in FIG. 5, on the basis of the touch display driving module in FIG. 4, the touch display driving module further includes a host H1. The touch control circuitry 121 is electrically coupled to the host H1, and is further configured to transmit the touch point coordinate information to the host H1. The host H1 is further electrically coupled to the time sequence control unit circuitry 40, and configured to perform the control response in accordance with the touch point coordinate information, generate control response image information, and return the control response image information to the time sequence control unit circuitry 40. The control response image information is display information corresponding to the control response image. The time sequence control unit circuitry 40 is further configured to display the control response image on the display screen in accordance with the control response image information, and the control response image is an image showing a response action after the display screen has been touched.

During the implementation, the host H1 may return the generated control response image information to the time sequence control unit circuitry 40, and the time sequence control unit circuitry may display the control response image on the display screen in accordance with the control response image information.

A structure of the time sequence touch control chip adopted in the embodiments of the present disclosure will be described in details hereinafter.

Figure 6:
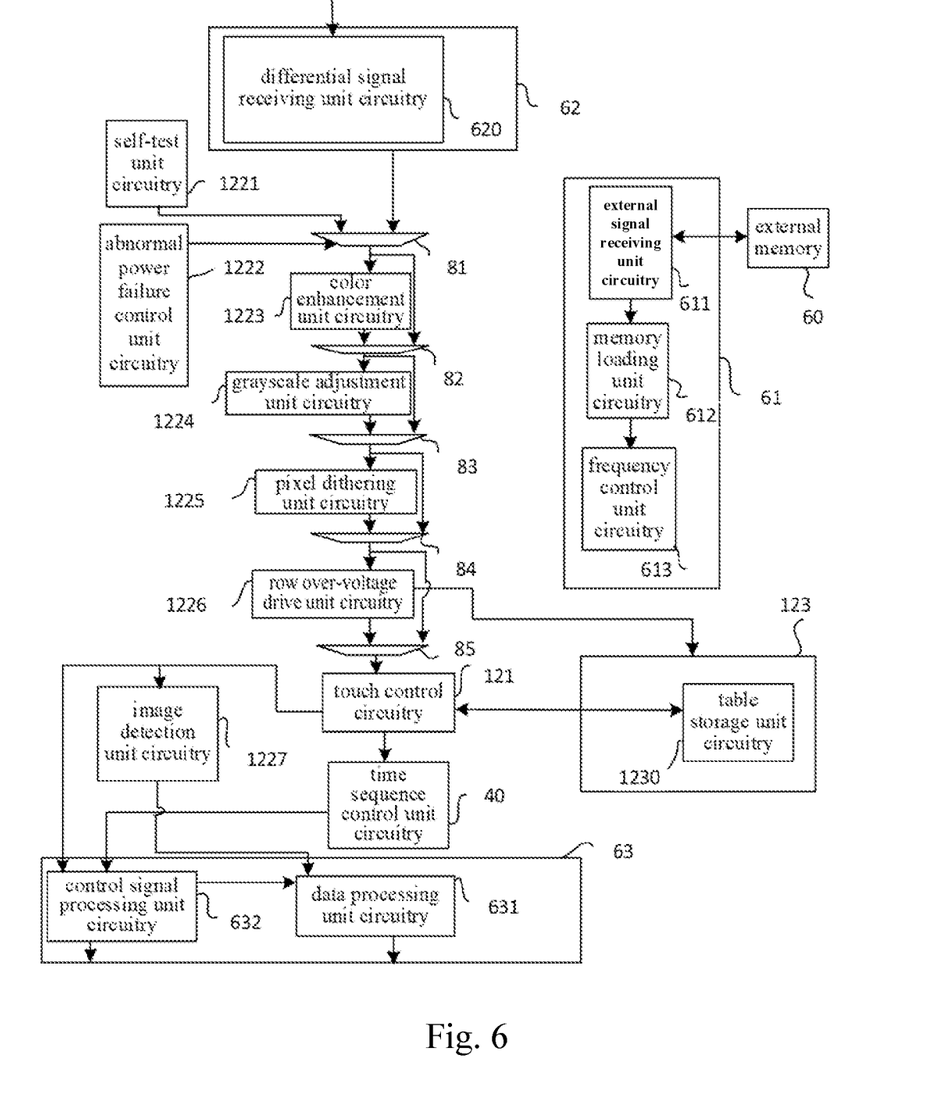
FIG. 6 is a schematic view of a time sequence touch control chip in the touch display driving module according to one embodiment of the present disclosure.

As shown in FIG. 6, the time sequence touch control chip includes an oscillation clock circuitry 61, a display signal receiving circuitry 62, a display control circuitry, a storage array 123, a signal processing circuitry 63 and a touch control circuitry 121.

The oscillation clock circuitry 61 includes an external signal receiving unit circuitry 611, a memory loading unit circuitry 612, and a frequency control unit circuitry 613.

The oscillation clock circuitry 61 is configured to generate an internal oscillation signal for an integrated circuit (IC), so as to provide a reference basis for the synchronization of a timeline and tick control of the IC.

The external signal receiving unit circuitry 611 is electrically coupled to the external memory 60, and configured to receive a signal from the external memory 60 to realize and control the communication of the time sequence touch control chip with an external clock signal.

The memory loading unit circuitry 612 is a circuitry with tab and register architecture, and configured to store, invoke and describe variables of the control signal.

The frequency control unit circuitry 613 is configured to perform frequency division or frequency multiplication on a frequency, adjust an internal working frequency, and maintain the stable frequency.

The display signal receiving circuitry 62 is configured to receive a display signal. The display signal receiving circuitry 62 includes a differential signal receiving unit circuitry 620 configured to receive the display signal. The display signal is a low voltage differential signal (LVDS).

The display control circuitry 122 is configured to render, e.g., describe and process, contents to be displayed on the display screen, so as to generate data contents to be displayed on the display screen.

The display control circuitry includes a self-test unit circuitry 1221, an abnormal power failure control unit circuitry 1222, a color enhancement unit circuitry 1223, a grayscale adjustment unit circuitry 1224, a pixel dithering unit circuitry 1225, a row over-voltage driving unit circuitry 1226, a time sequence control unit circuitry 40, and an image detection unit circuitry 1227.

The self-test unit circuitry 1221 adopts a built-in self-test technology which includes a test image generation circuitry, a time sequence circuitry, a mode selection circuitry, and a debugging circuitry, so as to reduce the test cost, improve an error coverage, and improve the independent test capability of the IC.

The abnormal power failure control unit circuitry 1222 is configured to control an abnormal power failure and maintain a safe operation state.

The color enhancement unit circuitry 1223 is configured to provide a color enhancement function algorithm, perform weighted correction using a designed saturation correction curve and a tone parameter curve conforming to color characteristics of a display content, and perform processings using a designed brightness correction curve. The color enhancement function algorithm used to enhance an image color, which fills a gap in the color enhancement algorithm for the display content.

The grayscale adjustment unit circuitry 1224 is configured to provide a grayscale adjustment and optimization algorithm.

The pixel dithering unit circuitry 1225 is configured to provide a pixel dithering algorithm package, perform color mixing in both time and spatial domains on two adjacent grayscales using a visual inertia of human eyes, so as to display an image at an intermediate brightness value, thereby to enable a thin film transistor-liquid crystal display (TFT-LCD) to display the image at a target grayscale value.

The row over-voltage driving unit circuitry 1226 is configured to provide a row over-voltage driving algorithm package, so as to increase a driving capability between rows, thereby to reduce a grayscale difference.

The time sequence control unit circuitry 40 is configured to perform IC operation adjustment, such as the adjustment of signal sequence and polarity adjustment, provide the coordinate pattern display information, and display the touch point image.

The time sequence control unit circuitry 40 is configured to display and render the background image in accordance with touch point coordinate information and the coordinate pattern display information so as to generate the touch point image information.

The image detection unit circuitry 1227 is configured to detect a special image and adjust a corresponding operating state, so as to control the special image.

The storage array 123 includes a table storage unit circuitry 1230, and the background image is stored in the table storage unit circuitry 1230.

During the implementation, the storage array 123 is considered as a table. Similar to a principle of retrieving a table, one row and then one column are specified to accurately find a cell, which is a basic addressing principle of a memory chip.

The signal processing circuitry 63 is configured to process a signal to generate an internal data structure of a display system, so as to ensure the signal quality and improve the data transmission speed.

The signal processing circuitry 63 includes a data processing unit circuitry 631 and a control signal processing unit circuitry 632.

The data processing unit circuitry 631 is configured to process a data packet with a clock embedded differential signal (CEDS) data structure, and store, invoke and decode the signal.

The control signal processing unit circuitry 632 is configured to process the control signal, and output a control signal for the row scanning and column scanning of output data.

The touch control circuitry 121 is configured to collect and calculate the touch data signal, so as to generate the touch point position information.

The touch control circuitry 121 is electrically coupled to a touch detection chip (not shown in FIG. 6), and configured to sample a gain-filtered touch data signal from the touch detection chip and calculate the gain-filtered touch data signal so as to obtain the touch point coordinate information.

The touch control circuitry 121 is further electrically coupled to the storage array 123, and configured to obtain the background image and transmit the touch point coordinate information and the background image to the time sequence control unit circuitry 40.

In FIG. 6, 81 represents a first amplifier, 82 represents a second amplifier, 83 represents a third amplifier, 84 represents a fourth amplifier, and 85 represents a fifth amplifier.

Figure 7:
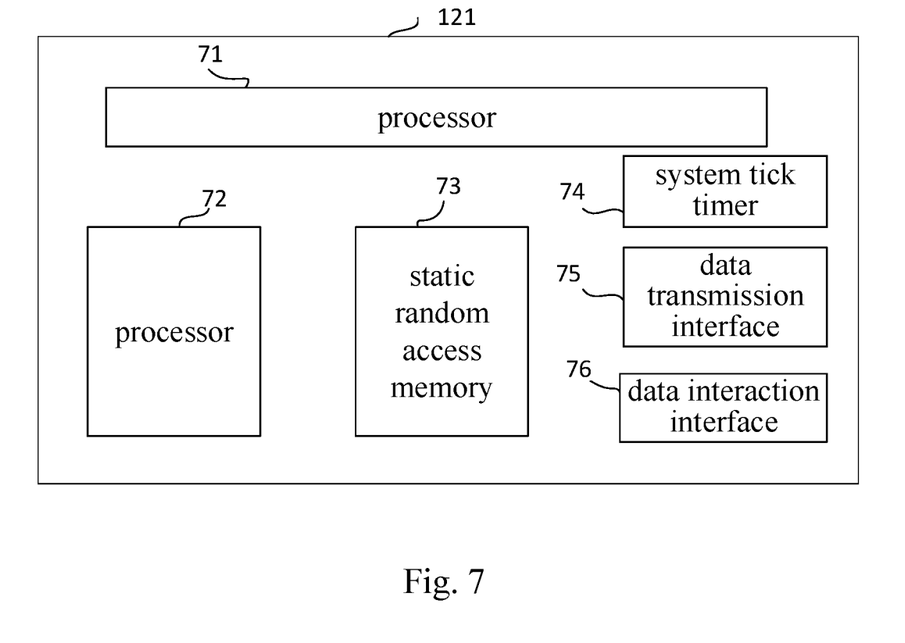
FIG. 7 is a schematic view of a touch control circuitry in the sequential touch control chip according to one embodiment of the present disclosure.

As shown in FIG. 7, the touch control circuitry 121 includes a processor 71, a flash memory 72, a static random access memory 73, a system tick timer 74, a data transmission interface 75, and a data interaction interface 76.

The processor 71 is a 32-bit reduced instruction set computer (RISC) processor for processing the touch data, and it is configured to calculate touch point original data to generate location information.

The flash memory 72 is configured to store therein a touch calculation program and initialization information.

The static random access memory 73 is configured to temporarily store therein an operand and a touch control algorithm.

The data transmission interface 75 includes an I2C interface (a two-wire synchronous serial bus interface) and a universal serial bus (USB) interface for updating firmware with the host.

The data interaction interface 76 is configured to perform data interaction with the touch detection chip so as to receive the touch data. The data interaction interface 76 includes a serial peripheral interface (SPI) and a general purpose input/output (GPIO) interface.

Figure 8:
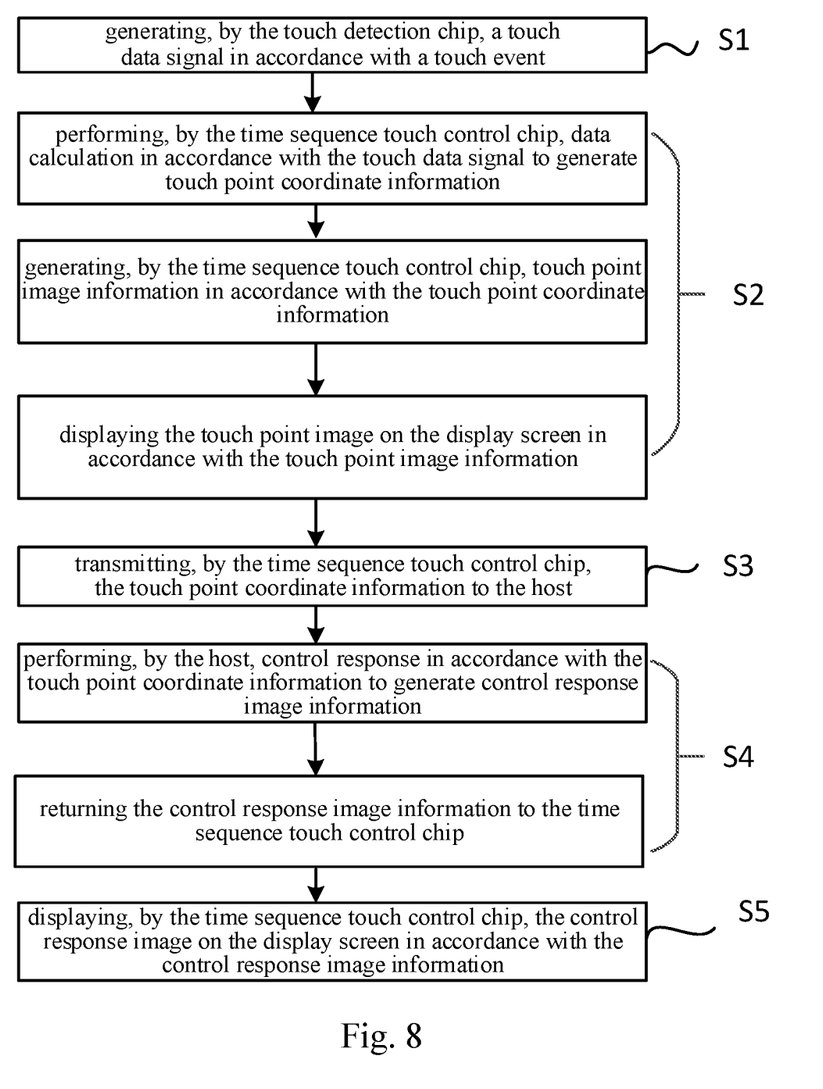
FIG. 8 is a flowchart of a touch display driving method according to one embodiment of the present disclosure.

The present disclosure further provides in some embodiments a touch display driving method for the above-mentioned touch display driving module. As shown in FIG. 8, the touch display driving method includes: S1 of generating, by the touch detection chip, a touch data signal in accordance with a touch event; and S2 of performing, by the time sequence touch control chip, data calculation in accordance with the touch data signal to generate touch point coordinate information, generating, by the time sequence touch control chip, touch point image information in accordance with the touch point coordinate information, and displaying the touch point image on the display screen in accordance with the touch point image information. The touch point image information is display information corresponding to the touch point image, the touch point coordinate information is information carrying coordinates of a touch point, and the touch point image is an image showing that the touch point is touched According to the touch display driving method in the embodiments of the present disclosure, the time sequence touch control chip generates the touch point image information before displaying a control response image, so it is able to display the touch point image in advance, thereby to reduce a touch response time.

During the implementation, the touch display driving module further includes a host. As shown in FIG. 8, the touch display driving method further includes: S3 of transmitting, by the time sequence touch control chip, the touch point coordinate information to the host; S4 of performing, by the host, control response in accordance with the touch point coordinate information to generate control response image information, and returning the control response image information to the time sequence touch control chip, the control response image information being display information corresponding to the control response image; and S5 of displaying, by the time sequence touch control chip, the control response image on the display screen in accordance with the control response image information, the control response image being an image showing a response action after the display screen has been touched.

In the embodiments of the present disclosure, the host receives the touch point coordinate information from the time sequence touch control chip, performs the control response in accordance with the touch point coordinate information, generates the control response image information, and transmits the control response image information to the time sequence touch control chip. The time sequence touch control chip displays the control response image.

Figure 9:
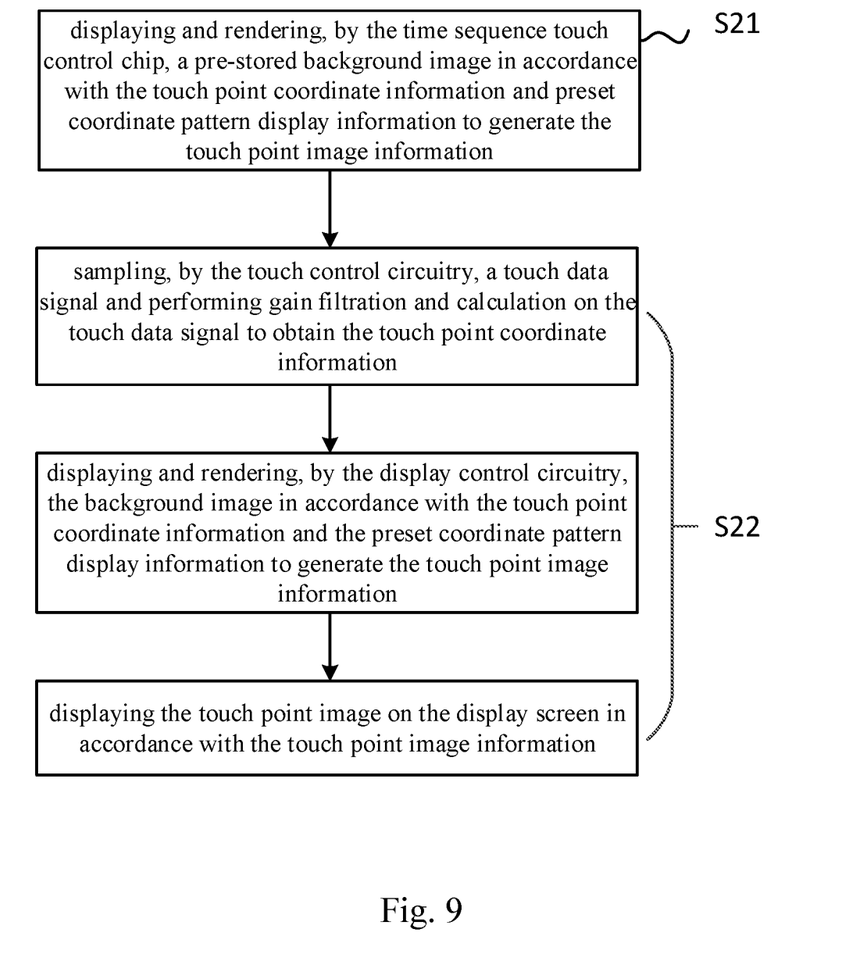
FIG. 9 is a flowchart of a touch display driving method according to one embodiment of the present disclosure.

As shown in FIG. 9, S1 of the generating, by the time sequence touch control chip, the touch point image in accordance with the touch point coordinate information includes S21 of displaying and rendering, by the time sequence touch control chip, a pre-stored background image in accordance with the touch point coordinate information and preset coordinate pattern display information to generate the touch point image information, and the coordinate pattern display information carries a correspondence between the touch point coordinate information and the touch point pattern information.

During the implementation, the coordinate pattern display information is preset in the time sequence control touch control chip, and the coordinate pattern display information carries the correspondence between the touch point coordinate information and the touch point pattern information. The time sequence control touch control chip generates the touch point pattern information corresponding to the touch point coordinate information in accordance with the touch point coordinate information and the correspondence, and displays and renders the pre-stored background image in accordance with the touch point pattern information to generate the touch point image information.

As shown in FIG. 9, the time sequence touch control chip includes a touch control circuitry, a display control circuitry and a storage array, and the background image is stored in the storage array. The performing, by the time sequence touch control chip, data calculation in accordance with the touch data signal to generate touch point coordinate information in S2 includes sampling, by the touch control circuitry, a touch data signal and performing gain filtration and calculation on the touch data signal to obtain the touch point coordinate information in S22. The generating, by the time sequence touch control chip, touch point image information in accordance with the touch point coordinate information in S2 includes displaying and rendering, by the display control circuitry, the background image in accordance with the touch point coordinate information and the preset coordinate pattern display information to generate the touch point image information in S22.

In the embodiments of the present disclosure, the time sequence touch control chip includes the touch control circuitry, the display control circuitry, and the storage array. The touch detection chip performs the gain filtration on the touch data signal. The touch control circuitry samples the gain-filtered touch data signal and obtains the touch point coordinate information in accordance with the touch data signal. The background image is pre-stored in the storage array. The display control circuitry displays and renders the background image in accordance with the touch point coordinate information and the preset coordinate pattern display information so as to generate the touch point image information.

During the implementation, the display control circuitry includes a time sequence control unit circuitry, and the coordinate pattern display information is provided in the time sequence control unit circuitry. The generating, by the time sequence touch control chip, the touch point image information in accordance with the touch point coordinate information includes: obtaining, by the touch control circuitry, the background image from the storage array, and transmitting the touch point coordinate information and the background image to the time sequence control unit circuitry; and displaying and rendering, by the time sequence control unit circuitry, the background image in accordance with the touch point coordinate information and the coordinate pattern display information to generate the touch point image information.

During the implementation, the display control circuitry includes the time sequence control unit circuitry, and the coordinate pattern display information is provided in the time sequence control unit circuitry. The time sequence control unit circuitry is configured to display and render the background image in accordance with the touch point coordinate information and the coordinate pattern display information so as to generate the touch point image information.

In the embodiments of the present disclosure, the touch display driving module further includes a host. The touch display driving method further includes: transmitting, by the touch control circuitry, the touch point coordinate information to the host; performing, by the host, control response in accordance with the touch point coordinate information, generating control response image information, and returning the control response image information to the time sequence control unit circuitry, the control response image information being display information corresponding to the control response image; and displaying, by the time sequence control unit circuitry, the control response image on the display screen in accordance with the control response image information, the control response image being an image showing a response action after the display screen has been touched.

The present disclosure further provides in some embodiments a display device including the above-mentioned touch display driving module.

The display device may be any product or member having a display function such as a cell phone, a tablet computer, a television, a display, a notebook computer, a digital photo frame or a navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A touch display driving module for performing a touch display driving operation on a display screen, comprising a touch detection chip and a time sequence touch control chip, wherein
the touch detection chip is configured to generate a touch data signal in accordance with a touch event;
the time sequence touch control chip is configured to perform data calculation in accordance with the touch data signal to generate touch point coordinate information, generate touch point image information in accordance with the touch point coordinate information, and display a touch point image on the display screen in accordance with the touch point image information; and the touch point coordinate information is information carrying coordinates of a touch point, the touch point image is an image showing that the touch point is touched, and the touch point image information is display information corresponding to the touch point image, wherein the touch display driving module further comprises a host, the time sequence touch control chip is further configured to transmit the touch point coordinate information to the host;

the host is configured to perform control response in accordance with the touch point coordinate information to generate control response image information, and return the control response image information to the time sequence touch control chip, and the control response image information is display information corresponding to the control response image; and the time sequence touch control chip is further configured to display the control response image on the display screen in accordance with the control response image information, and the control response image is an image showing a response action after the display screen has been touched.

2. The touch display driving module according to claim 1, wherein the time sequence touch control chip is specifically configured to display and render a pre-stored background image in accordance with the touch point coordinate information and preset coordinate pattern display information so as to generate the touch point image information, and the coordinate pattern display information carries a correspondence between the touch point coordinate information and the touch point pattern information.

3. The touch display driving module according to claim 2, wherein the time sequence touch control chip comprises a touch control circuitry, a display control circuitry and a storage array; and the touch detection chip is further configured to perform gain filtration on the touch data signal to generate a gain-filtered touch data signal, the touch control circuitry is configured to sample the gain-filtered touch data signal and calculate the gain-filtered touch data signal to obtain the touch point coordinate information, the pre-stored background image is pre-stored in the storage array, and the display control circuitry is configured to display and render the pre-stored background image in accordance with the touch point coordinate information and preset coordinate pattern display information to generate the touch point image information.

4. The touch display driving module according to claim 3, wherein the display control circuitry comprises a time sequence control unit circuitry, the coordinate pattern display information is provided in the time sequence control unit circuitry, the touch control circuitry is electrically coupled to the storage array and configured to obtain the pre-stored background image and transmit the touch point coordinate information and the pre-stored background image to the time sequence control unit circuitry, and the time sequence control unit circuitry is configured to display and render the pre-stored background image in accordance with the touch point coordinate information and the coordinate pattern display information to generate the touch point image information.

5. The touch display driving module according to claim 3, further comprising a host, wherein the touch control circuitry is further configured to transmit the touch point coordinate information to the host;

the host is configured to perform control response in accordance with the touch point coordinate information to generate control response image information, and return the control response image information to the time sequence control unit circuitry, and the control response image information is display information corresponding to the control response image; and the time sequence control unit circuitry is further configured to display the control response image on the display screen in accordance with the control response image information, and the control response image is an image showing a response action after the display screen has been touched.

6. A touch display driving method for the touch display driving module according to claim 1, comprising:

generating, by the touch detection chip, a touch data signal in accordance with a touch event;

performing, by the time sequence touch control chip, data calculation in accordance with the touch data signal to generate touch point coordinate information, generating, by the time sequence touch control chip, touch point image information in accordance with the touch point coordinate information, and displaying the touch point image on the display screen in accordance with the touch point image information;

transmitting, by the time sequence touch control chip, the touch point coordinate information to the host;

performing, by the host, control response in accordance with the touch point coordinate information to generate control response image information, and returning the control response image information to the time sequence touch control chip; and displaying, by the time sequence touch control chip, the control response image on the display screen in accordance with the control response image information, wherein the touch point image information is display information corresponding to the touch point image, the touch point coordinate information is information carrying coordinates of a touch point, and the touch point image is an image showing that the touch point is touched, the control response image information is display information corresponding to the control response image, the control response image is an image showing a response action after the display screen has been touched.

7. The touch display driving method according to claim 6, wherein the generating, by the time sequence touch control chip, the touch point image in accordance with the touch point coordinate information comprises displaying and rendering, by the time sequence touch control chip, a pre-stored background image in accordance with the touch point coordinate information and preset coordinate pattern display information to generate the touch point image information, and the coordinate pattern display information carries a correspondence between the touch point coordinate information and the touch point pattern information.

8. The touch display driving method according to claim 6, wherein the time sequence touch control chip comprises a touch control circuitry, a display control circuitry and a storage array, and a pre-stored background image is stored in the storage array;

the performing, by the time sequence touch control chip, data calculation in accordance with the touch data signal to generate touch point coordinate information comprises sampling, by the touch control circuitry, a touch data signal and performing gain filtration and calculation on the touch data signal to obtain the touch point coordinate information; and the generating, by the time sequence touch control chip, touch point image information in accordance with the touch point coordinate information comprises displaying and rendering, by the display control circuitry, the pre-stored background image in accordance with the touch point coordinate information and the preset coordinate pattern display information to generate the touch point image information.

9. The touch display driving method according to claim 8, wherein the display control circuitry comprises a time sequence control unit circuitry, and the coordinate pattern display information is provided in the time sequence control unit circuitry, wherein the generating, by the time sequence touch control chip, the touch point image information in accordance with the touch point coordinate information comprises:

obtaining, by the touch control circuitry, the pre-stored background image from the storage array, and transmitting the touch point coordinate information and the pre-stored background image to the time sequence control unit circuitry; and displaying and rendering, by the time sequence control unit circuitry, the pre-stored background image in accordance with the touch point coordinate information and the coordinate pattern display information to generate the touch point image information.

10. The touch display driving method according to claim 9, wherein the touch display driving module further comprises a host, wherein the touch display driving method further comprises:

transmitting, by the touch control circuitry, the touch point coordinate information to the host;

performing, by the host, control response in accordance with the touch point coordinate information, generating control response image information, and returning the control response image information to the time sequence control unit circuitry, the control response image information being display information corresponding to the control response image; and displaying, by the time sequence control unit circuitry, the control response image on the display screen in accordance with the control response image information, the control response image being an image showing a response action after the display screen has been touched.

11. A display device, comprising the touch display driving module according to claim 1.

12. The display device according to claim 11, wherein the time sequence touch control chip is specifically configured to display and render a pre-stored background image in accordance with the touch point coordinate information and preset coordinate pattern display information so as to generate the touch point image information, and the coordinate pattern display information carries a correspondence between the touch point coordinate information and the touch point pattern information.

13. The display device according to claim 12, wherein the time sequence touch control chip comprises a touch control circuitry, a display control circuitry and a storage array; and the touch detection chip is further configured to perform gain filtration on the touch data signal to generate a gain-filtered touch data signal, the touch control circuitry is configured to sample the gain-filtered touch data signal and calculate the gain-filtered touch data signal to obtain the touch point coordinate information, the pre-stored background image is pre-stored in the storage array, and the display control circuitry is configured to display and render the pre-stored background image in accordance with the touch point coordinate information and preset coordinate pattern display information to generate the touch point image information.

14. The display device according to claim 13, wherein the display control circuitry comprises a time sequence control unit circuitry, the coordinate pattern display information is provided in the time sequence control unit circuitry, the touch control circuitry is electrically coupled to the storage array and configured to obtain the pre-stored background image and transmit the touch point coordinate information and the pre-stored background image to the time sequence control unit circuitry, and the time sequence control unit circuitry is configured to display and render the pre-stored background image in accordance with the touch point coordinate information and the coordinate pattern display information to generate the touch point image information.

15. The display device according to claim 13, wherein the touch display driving module further comprises a host, wherein the touch control circuitry is further configured to transmit the touch point coordinate information to the host;

the host is configured to perform control response in accordance with the touch point coordinate information to generate control response image information, and return the control response image information to the time sequence control unit circuitry, and the control response image information is display information corresponding to the control response image; and the time sequence control unit circuitry is further configured to display the control response image on the display screen in accordance with the control response image information, and the control response image is an image showing a response action after the display screen has been touched.

16. A touch display driving module for performing a touch display driving operation on a display screen, comprising a touch detection chip and a time sequence touch control chip, wherein the touch detection chip is configured to generate a touch data signal in accordance with a touch event;

the time sequence touch control chip is configured to perform data calculation in accordance with the touch data signal to generate touch point coordinate information, generate touch point image information in accordance with the touch point coordinate information, and display a touch point image on the display screen in accordance with the touch point image information; and the touch point coordinate information is information carrying coordinates of a touch point, the touch point image is an image showing that the touch point is touched, and the touch point image information is display information corresponding to the touch point image, wherein the time sequence touch control chip is specifically configured to display and render a pre-stored background image in accordance with the touch point coordinate information and preset coordinate pattern display information so as to generate the touch point image information, and the coordinate pattern display information carries a correspondence between the touch point coordinate information and the touch point pattern information.

\* \* \* \* \*